Sept. 26, 1933.  A. A. G. MOUGEOTTE  1,928,498
SEAT STRUCTURE
Filed Dec. 20, 1930   2 Sheets-Sheet 1
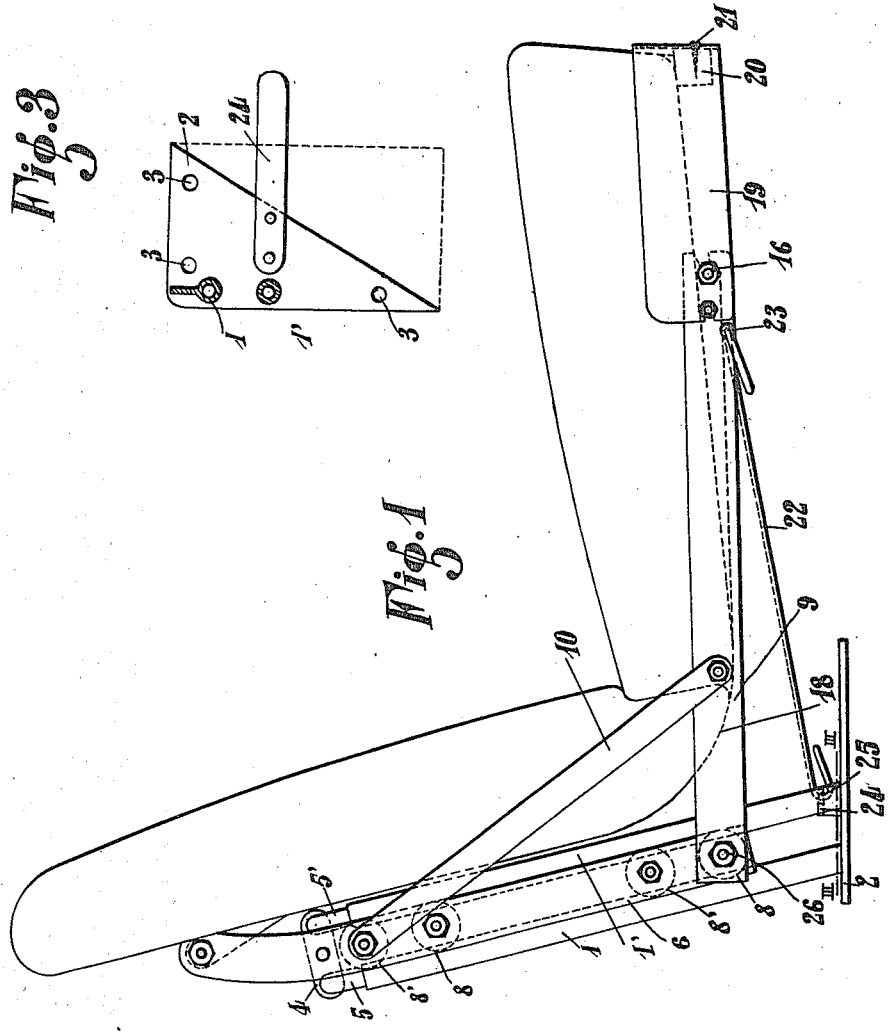
Inventor
Auguste A. G. Mougeotte
by Wilkinson & Mawhinney
Attorneys.

Sept. 26, 1933.       A. A. G. MOUGEOTTE       1,928,498
SEAT STRUCTURE
Filed Dec. 20, 1930       2 Sheets-Sheet 2
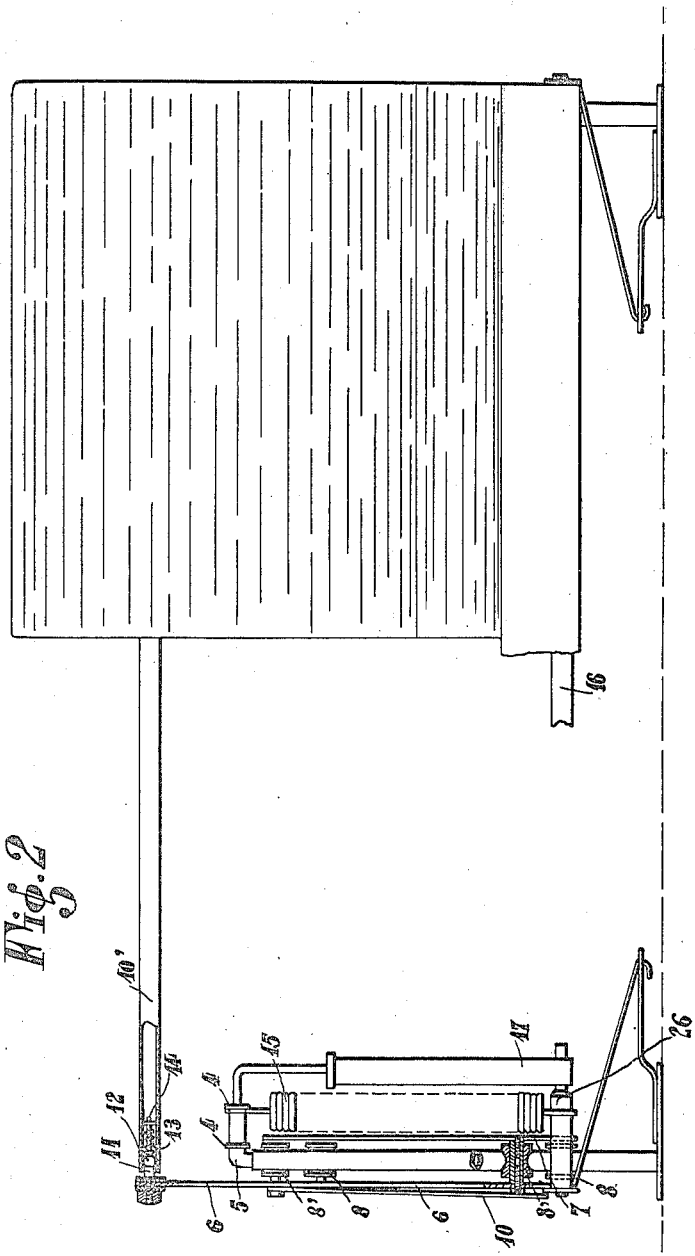
Inventor
Auguste A. G. Mougeotte
by   Wilkinson & Mawhinney
Attorneys.

Patented Sept. 26, 1933

1,928,498

UNITED STATES PATENT OFFICE 1,928,498

SEAT STRUCTURE

Auguste Angèle Gaston Mougeotte, Melay, France

Application December 20, 1930, Serial No. 503,844, and in France December 26, 1929

5 Claims. (Cl. 155—53)

There already exist a certain number of devices for resiliently suspending seats of vehicles, in particular of automobile vehicles, in order to absorb shocks.

Such devices are, however, intended for independent seats accommodating one person only, whose centre of gravity is substantially in the centre of the seat. They are therefore not directly applicable to seats accommodating a plurality of persons since in the case of such seats, which accommodate a variable number of persons situated in different places, the load varies considerably both as to the weight applied and to the point of application.

The present invention relates to a resiliently suspended seat accommodating a plurality of persons. Said seat is characterized by the fact that it comprises an assembly constituted by the seat and the back and is carried by a movable frame sliding on two uprights rigidly fixed to the floor of the car, said frame being resiliently deformable, and a resilient arrangement uniting each of the sides of said deformable frame to the fixed upright on which it slides.

According to one embodiment of the invention, said resilient arrangement is constituted by a spring and a shock absorber. Each of the fixed uprights is constituted by two parallel tubes mounted on a plate secured to the floor of the car, united at their upper part by a stay and carrying at their upper part a member perpendicular to their plane and to which are attached the spring and the shock absorber.

According to the invention each of the lateral sides of the movable frame is constituted by two arms rigidly connected to each other, one parallel to the fixed upright, the other substantially horizontal, the first arm being constituted by two cheeks arranged on either side of the corresponding fixed upright and between which are mounted rollers rolling on the tubes constituting the uprights.

Said lateral sides of the movable frame carry pins perpendicular to the plane of such side and to which are fixed the spring and the shock absorber connecting the upright to the side of the movable frame.

The transverse sides or cross pieces of the movable frame are swivelled at both their ends on the lateral sides so as to allow the play of each of said lateral sides independently of the other.

Said swivel joint is obtained by making each cross piece tubular and fitting it on to a tenon ending in a rounded portion of larger diameter than itself, said tenon being carried by the end of the lateral side.

A spring is arranged in said tube and lightly repels the rounded portions of the tenons so as to prevent the parts rattling while the vehicle is in motion.

According to the invention the cross pieces of the movable frame are united by a fabric sheet and on said fabric sheet are placed the seat and back cushions.

Other advantages and peculiarities of the invention will become apparent from the following description taken in conjunction with the accompanying drawings, which show diagrammatically and by way of example one embodiment of the invention.

In said drawings:

Fig. 1 is a side view of the seat according to the invention.

Fig. 2 is a front view thereof, the cushions being removed from half of the seat so as to show the method of mounting, a part of which is shown in section.

Fig. 3 is a section along the line III—III of Fig. 1.

The seat according to the invention is essentially constituted by two uprights arranged at both ends of the seat, rigidly secured to the floor and serving to support said seat. Each of said uprights is constituted by two tubes 1 and 1' forming a slide; they are secured to the floor or the chassis of the car in any suitable manner; for example, they are fixed on a plate 2 (Fig. 3) which is itself secured to the floor of the car by means of metal or wood screws passing in the holes 3 of said plate.

Said tubes 1 and 1' are parallel to each other and are held apart at the top by means of cross pieces 4 uniting two bent members 5 and 5' fitted on to the tubes 1 and 1'.

Said fixed uprights support the movable frame which carries the seat and back cushions. Said frame is composed of two transverse sides or cross pieces and of two lateral sides, the lateral sides are themselves composed of two arms; one, substantially parallel to the fixed upright and the other, substantially horizontal. The arm parallel to the rigid upright is constituted by two plates 6 and 7 arranged on either side of the tubes 1 and 1' and between which are mounted grooved rollers 8 and 8' shaped so as to engage over the tubes. The spindles of said rollers are moreover not in alignment, they are slightly offset, the rollers 8 towards the left and the rollers 8' towards the right looking at Fig. 1 in such a manner that if the assembly formed by the two plates 6 and 7 slides relative to the tubes 1 and 1', the two rollers 8 can roll on the tube 1 and the two rollers 8' on the tube 1'. The plate 6 extends upwardly beyond the bent members 5 whereas the opposite plate 7 stops at the height of said members. On the arm constituted by said two plates 6 and 7, is mounted the horizontal arm or longitudinal 9, said two arms being connected to each other by a rigid brace 10 so that said two arms form a rigid assembly constituting one lateral side of the movable frame, as aforesaid. Said rigid assembly can of course be obtained in any other manner; for example one of the plates could carry an extension running in the direction of the side member and being secured to said longitudinal at several points.

The cross pieces of said movable frame are pivotally mounted on the lateral sides; for this purpose said cross pieces are constituted by tubes mounted on the one hand at the end of the plates 6 and on the other hand at the end of the longitudinals 9. The upper cross piece 10' shown in Figure 2 is constituted by a tube 10' both ends of which fit on to a tenon 11 carried by the end of the plate 6 and ending in a rounded part 12 of greater cross section than the tenon.

It will be seen that with the above method of construction, the tube 10' can pivot, to a certain extent, about the rounded part 12. In order to prevent the parts rattling while the car is in motion, a spring 13 is provided which bears, on one side, on the rounded part 12, and, on the other side, on a stop 14 arranged for this purpose in the tube 10'. The same result could be obtained by means of a rubber ring passed over the tenon 11 and clamped between the plate 6 and the end of the tube 10'. The tube 10' is of course mounted in the same manner at its other end, and, moreover, the cross piece 16 mounted on the ends of the longitudinals 9 is also mounted on the latter in the same manner. It follows that the movable frame is completely deformable at its four apices, and that, consequently, one of the lateral sides can slide on the fixed upright without the lateral side located at the other end of the seat being compelled to follow the movement.

The movable frame constituted as described above is connected to the fixed upright by means of a spring 15 carried at its upper end by the bent members 5, said spring carrying at its lower end the lateral side of the movable frame, for example by being secured to the pin 26 on which are mounted the two arms of said lateral side. The spring 15 is regulated at the necessary tension for approximately compensating the weight of a passenger. Between the same members, and parallel to the spring 15, a shock absorber 17 of any known type, for example, a dash pot, is also arranged. On the movable frame thus constituted and suspended, are placed the cushions constituting the seat and the back. Said cushions can be carried, for example, by a flexible fabric 18 mounted on the cross pieces of the movable frame as shown in Figure 1. The cushions might even not be mounted on springs, as is the case with the usual seat, since the shocks due to unevenness of the road are damped by the springs 15; it would moreover be possible not to use cushions, it would suffice for the fabric itself to be upholstered.

In the event of cushions being used, as shown in Figure 1, a band within which is adapted a wooden rod 20 which is fixed by means of screws 21, serves as a rest and to accommodate the end of the seat cushion on the longitudinal 9.

In order to avoid, in the case of violent side reactions, that the latter shall be solely absorbed by the rollers 8 and 8' bearing on the tubes 1 and 1', tie bars 22 may be provided, connected on the one hand, to the end of the longitudinal at 23, and, on the other hand, at 25, to a member 24 secured to the plate 2, said tie bars 22 resist the side reactions, and as they are pivotally mounted at 23 and 25, nevertheless allow the free movement of the frame on the rigid uprights.

With the seat such as described above, the fabric, either directly or through the instrumentality of cushions, moulds itself completely to the shape of the body and thus affords a very large bearing surface, and a minimum pressure per $cm^2$. When there is only one passenger on the seat, it is almost certain that such passenger will sit at one of the ends thereof. In this case, his weight rests almost entirely on one of the slides. When the shaking due to the unevenness of the road occurs, the whole part of the seat on which the passenger is seated will yield resiliently, the corresponding lateral side moving in the slide and said movement being stopped by the corresponding spring 15, the return movement being absorbed by means of the shock absorber 17. The other lateral side of the movable frame will practically not move owing to the deformable mounting of the cross pieces of said frame. If the person was not exactly on the side of the car, but nearer the centre, the two sides would slide on the fixed uprights but in the proportion in which the weight of the passenger would be distributed on the two ends of the seat. Finally, if there were two passengers on the seat, each of the springs 15 would absorb the movement of the lateral sides in a manner corresponding to the movement imparted to the seat by the passenger near that side. Said springs could yield unequally according to the weights of the passengers and according to the extent of the movement imparted by the shock, which movement cannot be the same on both sides of the car. Finally, if there is a third passenger on the seat, the weight of the whole will be distributed on the two slides. It will be seen that in this manner, the necessary automatic effect is obtained for compensating the weight of the passengers, whatever be their number and in whatever manner they are placed on the seat. On the other hand, there are no respective displacements of the seat relative to the back, as is the case with most of the present systems of seats, since the cushion and the seat in this case form an assembly which moves as a whole.

I claim:

1. In a seat structure, the combination of two spaced uprights located one on each side of the seat, each upright including a pair of parallel tubes and means rigidly securing all of said tubes in fixed position, a pair of plates associated with each upright, a longitudinal secured to each pair of plates, two hollow cross-members, means for hingedly connecting one cross-member to one of each pair of plates and the other cross-member to said two longitudinals whereby said plates and longitudinals form with their cross-members the back and seat respectively of a deformable frame structure, means mounted between the two plates of each pair and engaging with the corresponding upright whereby said plates, and hence the whole of said deformable back and seat frame, may slide up and down said uprights, and means for resiliently suspending said back and seat frame from said uprights.

2. In a seat structure, the combination of two spaced uprights located one on each side of the seat, each upright including a pair of parallel tubes and means rigidly securing all of said tubes in fixed position, a pair of plates associated with each upright, a longitudinal secured to each pair of plates, two hollow cross-members, means for hingedly connecting one cross-member to one of each pair of plates and the other cross-member to said two longitudinals whereby said plates and longitudinals form with their cross-members the back and seat respectively of a deformable frame structure, means mounted between the two plates of each pair and engaging with the corresponding upright whereby said plates, and hence the whole of said deformable back and seat frame, may slide up and down said uprights, and a spring and shock absorber device connected between said uprights and said back and seat frame.

3. In a seat structure, the combination of two spaced uprights located one on each side of the seat, each upright including a pair of parallel tubes and means rigidly securing all of said tubes in fixed position, a pair of plates associated with each upright, a longitudinal secured to each pair of plates, two hollow cross-members, ball joints respectively secured to both of said longitudinals and to one of the plates of each pair and adapted to engage in said cross-members to form a pivotal connection, whereby said plates and longitudinals form with their corresponding cross-members the back and seat respectively of a deformable frame structure, means mounted between the two plates of each pair and engaging with the corresponding upright whereby said plates, and hence the whole of said deformable back and seat frame, may slide up and down said uprights, and means for resiliently suspending said back and seat frame from said uprights.

4. In a seat structure, the combination of two spaced uprights located one on each side of the seat, each upright including a pair of parallel tubes and means rigidly securing all of said tubes in fixed position, a pair of plates associated with each upright, a longitudinal secured to each pair of plates, two hollow cross-members, ball joints respectively secured to both of said longitudinals and to one of the plates of each pair and adapted to engage in said cross-members to form a pivotal connection, whereby said plates and longitudinals form with their cross-members the back and seat respectively of a deformable frame structure, means mounted between the two plates of each pair and engaging with the corresponding upright whereby said plates, and hence the whole of said deformable back and seat frame, may slide up and down said uprights, and a spring and shock absorber device connected between said uprights and said back and seat frame.

5. In a seat structure, the combination of two spaced uprights located one on each side of the seat, each upright including a pair of parallel tubes and means rigidly securing all of said tubes in fixed position, a pair of plates associated with each upright, a longitudinal secured to each pair of plates, two hollow cross-members, ball joints respectively secured to both of said longitudinals and to one of the plates of each pair and adapted to engage in said cross-members to form a pivotal connection, whereby said plates and longitudinals form with their cross-members the back and seat respectively of a deformable frame structure, means mounted between the two plates of each pair and engaging with the corresponding upright whereby said plates and hence the whole of said deformable back and seat frame, may slide up and down said uprights, means for resiliently suspending said back and seat frame from said uprights, and resilient means lodged in said cross-members and exerting pressure on said ball-joints to prevent rattling.

AUGUSTE ANGÈLE
GASTON MOUGEOTTE.